US006636099B2

(12) United States Patent
Shkap

(10) Patent No.: US 6,636,099 B2
(45) Date of Patent: Oct. 21, 2003

(54) LOGARITHMIC AMPLIFIER WITH TEMPERATURE COMPENSATED DETECTION SCHEME

(75) Inventor: Daniel Shkap, Cambridge, MA (US)

(73) Assignee: Maxim Integtated Products, Inc., Sunnyvale, CA (US)

( * ) Notice: Subject to any disclaimer, the term of this patent is extended or adjusted under 35 U.S.C. 154(b) by 0 days.

(21) Appl. No.: 09/948,296

(22) Filed: Sep. 6, 2001

(65) Prior Publication Data

US 2003/0052726 A1 Mar. 20, 2003

(51) Int. Cl.[7] .................................... G06F 7/556

(52) U.S. Cl. ...................... 327/350; 327/359; 327/361; 327/513

(58) Field of Search ............................ 327/350, 351, 327/352, 356, 359, 361, 512, 513, 560, 563

(56) References Cited

U.S. PATENT DOCUMENTS 4,442,549 A * 4/1984 Main .......................... 455/211
5,057,717 A * 10/1991 Kimura ...................... 327/351
5,345,185 A * 9/1994 Gilbert ....................... 327/350
5,481,218 A * 1/1996 Nordhold et al. ........... 327/350
5,677,561 A * 10/1997 Jensen ........................ 327/512
6,144,244 A * 11/2000 Gilbert ....................... 327/350

* cited by examiner

*Primary Examiner*—Terry D. Cunningham
*Assistant Examiner*—Long Nguyen
(74) *Attorney, Agent, or Firm*—Perkins Coie LLP

(57) ABSTRACT

A voltage mode logarithmic amplifier comprising: a first gain stage for providing an amplified rectified voltage signal responsive to an input voltage signal; a second gain stage for providing a further amplified rectified signal responsive to the input voltage signal; and an output node for producing an output voltage signal responsive to the amplified rectified voltage signal and the further amplified rectified voltage signal. The amplifier further includes: a self-biased replica stage operative to provide a voltage offset signal responsive to temperature; and a differential amplifier operative to receive the voltage offset signal and provide a temperature corrected output voltage signal responsive to the input voltage signal, wherein the differential amplifier is communicatively coupled to both the first gain stage and the second gain stage.

16 Claims, 8 Drawing Sheets

LOGARITHMIC AMPLIFIER WITH TEMPERATURE COMPENSATED DETECTION SCHEME

BACKGROUND OF THE INVENTION

1. Field of the Invention

The present invention relates to electronic signal metrology technology. In particular, the present invention relates to logarithmic detectors or amplifiers.

2. Description of the Prior Art

Logarithmic detectors or amplifiers are used to measure signals having a large dynamic range. For example, applications requiring compression of a wide range of analog input data and linearization of transducers having exponential outputs. Logarithmic amplifiers are used mainly in communication applications for measuring receive signal strength indicator (RSSI) and for controlling the radio frequency (RF) power transmitted in a power amplifier. A logarithmic amplifier (logamp) is a device that represents RF signals at its input by an equivalent decibel-scaled DC voltage at its output. FIG. 1A shows the output of a typical logarithmic amplifier at 10. An ideal response of a logamp is shown as a straight line 12 when plotted against a logarithmic/decibel scaled x-axis. This ideal response is approximated by the successive compression of a cascade of amplifiers. For small input signals a cascade of amplifiers will have large combined gain that progressively diminishes as larger input signals force latter stages of the cascade of amplifiers into compression. Increasing the gain increases the sensitivity of the logamp to small input signals. The actual response of a three stage logamp is shown as a series of three curves 14 when plotted on the same graph.

FIG. 1B shows the outputs of FIG. 1A plotted on a linear graph at 20. The ideal response of the logamp is shown as a curve 12 when plotted on a linear scale. An actual response of a three stage logamp is shown as line segments 14. As can be seen from FIG. 1B the deviation of the actual response 14 from the ideal response 12 can be reduced by simultaneously increasing the number of stages in the logamp and reducing the gain of each stage such that the small signal gain remains constant. Such action would result in a greater number of segments of the actual response curve 14 (FIG. 1B) and thereby reduce deviation between the two curves 12 and 14.

FIG. 2 shows the most common circuit implementation of a logamp at 50. This configuration is referred to as a current mode approach. A voltage in 52 is applied to a cascade of amplifiers 54. The voltage at the output of each amplifier 56 is converted to current at V/I converter 58. This current is rectified by rectifier 60. The rectified currents from all of the amplifiers 56 is summed across resistor 62, which after filtering results in a decibel-scaled DC voltage at the output node 64. Small input signals 52 will produce small combined rectified currents because only latter stages of the cascade of amplifiers 54 will convert the voltage into current. These small rectified currents will result in a small DC output voltage at output node 64. A large input signal will cause a larger number of currents to sum onto the output node 64 thereby producing a large DC output voltage.

The implementation shown in FIG. 2 is relatively insensitive to temperature variations. Each of the gain stages in the cascade 54 is biased with a proportional to absolute temperature (PTAT) current source and the combination of V/I converter 58 with the rectifier 60 is biased with a constant current source derived from a bandgap reference. In this way, the voltage at the output of each amplifier 56 remains constant despite changes in temperature, which results in constant current at the output of each rectifier 60 and an overall output voltage that is insensitive to temperature.

One problem with the current mode amplifier described above is that it can only function in a relatively limited bandwidth due to the use of current rectifiers 60. Another problem with the current mode amplifier is that such a device consumes a relatively large amount of current to operate.

Therefore, it is desirable to provide logarithmic amplifier that operates at a broad range of input frequencies. Furthermore, it is desirable to provide a logarithmic amplifier that consumes less current than current mode logarithmic amplifiers.

SUMMARY

The present invention teaches a logarithmic amplifier that operates at a broad range of input frequencies. The present invention also teaches a logarithmic amplifier that consumes less current than current mode logarithmic amplifiers.

A first embodiment of the present invention teaches a voltage mode logarithmic amplifier comprising: at least one first gain stage for providing at least one amplified rectified voltage signal at least partially responsive to at least one input voltage signal; at least one second gain stage for providing at least one further amplified rectified signal at least partially responsive to the at least one input voltage signal; and at least one output node for producing at least one output voltage signal that is at least partially responsive to the at least one amplified rectified voltage signal and the at least one further amplified rectified voltage signal.

The voltage mode logarithmic amplifier further including: at least one self-biased replica stage operative to provide at least one voltage offset signal responsive to temperature; and at least one differential amplifier operative to receive said at least one voltage offset signal and provide a temperature corrected output voltage signal responsive to said at least one input voltage signal, wherein said at least one differential amplifier is communicatively coupled to both said at least one first gain stage and said at least one second gain stage.

BRIEF DESCRIPTION OF THE DRAWINGS

PRIOR ART

PRIOR ART

PRIOR ART

DETAILED DESCRIPTION OF THE PREFERRED EMBODIMENTS

In the following detailed description of the embodiments, reference is made to the drawings that accompany and that are a part of the embodiments. The drawings show, by way of illustration, specific embodiments in which the invention may be practiced. Those embodiments are described in sufficient detail to enable those skilled in the art to practice the invention and it is to be understood that other embodiments may be utilized and that structural, logical, and electrical changes as well as other modifications may be made without departing from the spirit and scope of the present invention.

Figure 1A:
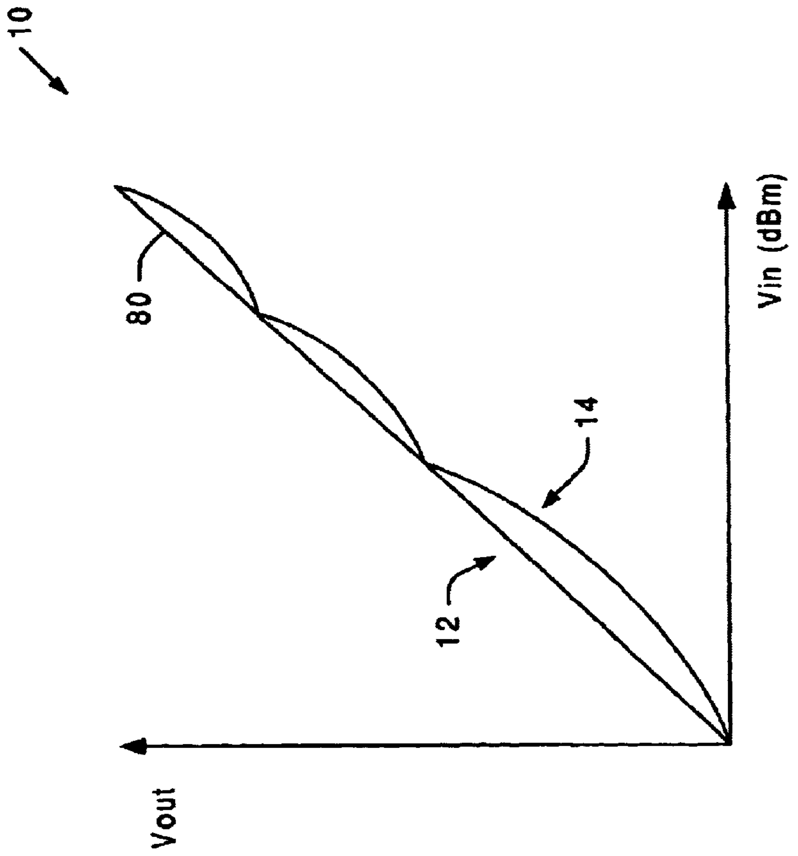
FIG. 1A (PRIOR ART)
FIG. 1A is a graph illustrating the output of a typical logarithmic amplifier.
Figure 1B:
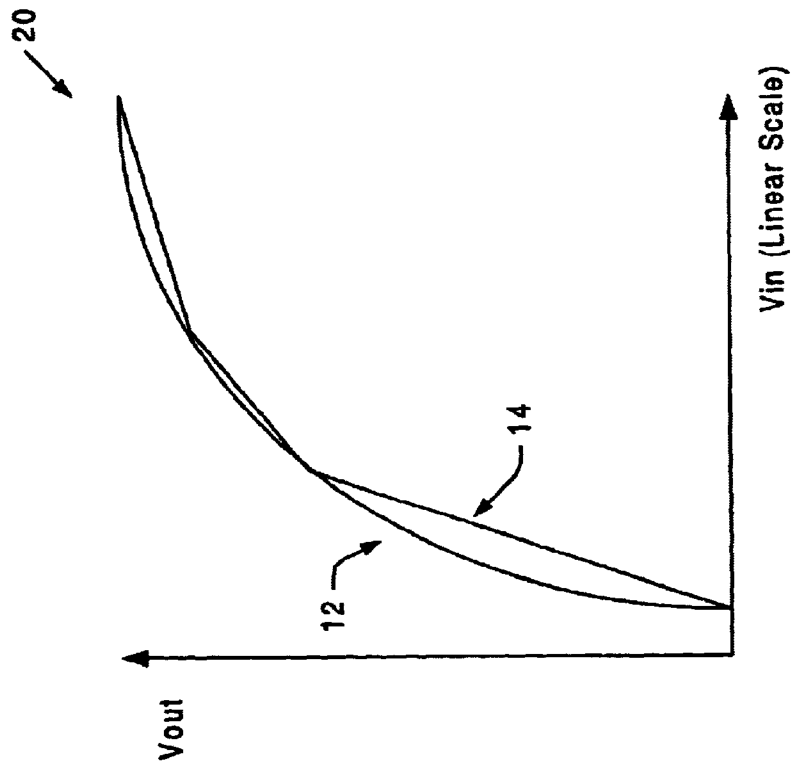
FIG. 1B (PRIOR ART)
FIG. 1B is a graph illustrating the output of the typical logarithmic amplifier of FIG. 1A plotted on a linear scale.
Figure 2:
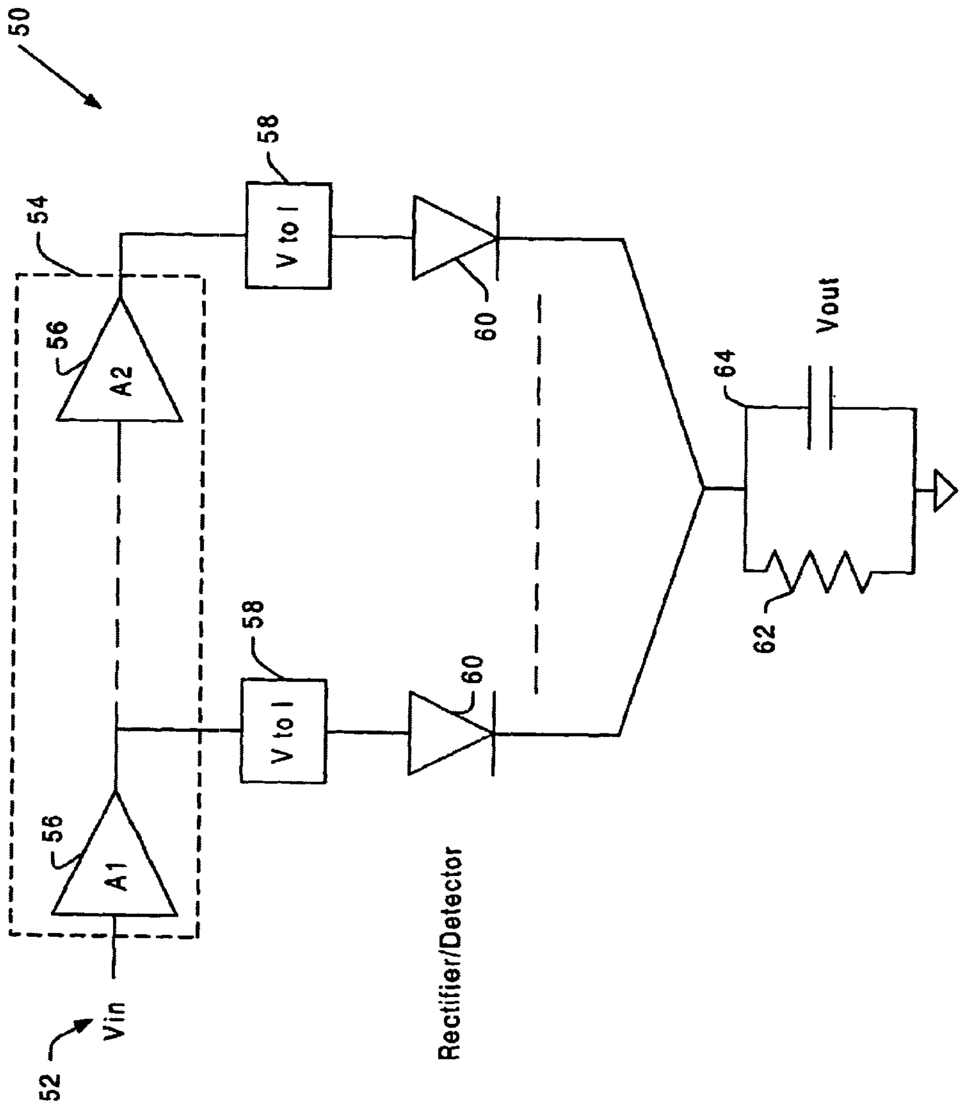
FIG. 2 (PRIOR ART)
FIG. 2 is a schematic block diagram of a typical current mode logarithmic amplifier.
Figure 3:
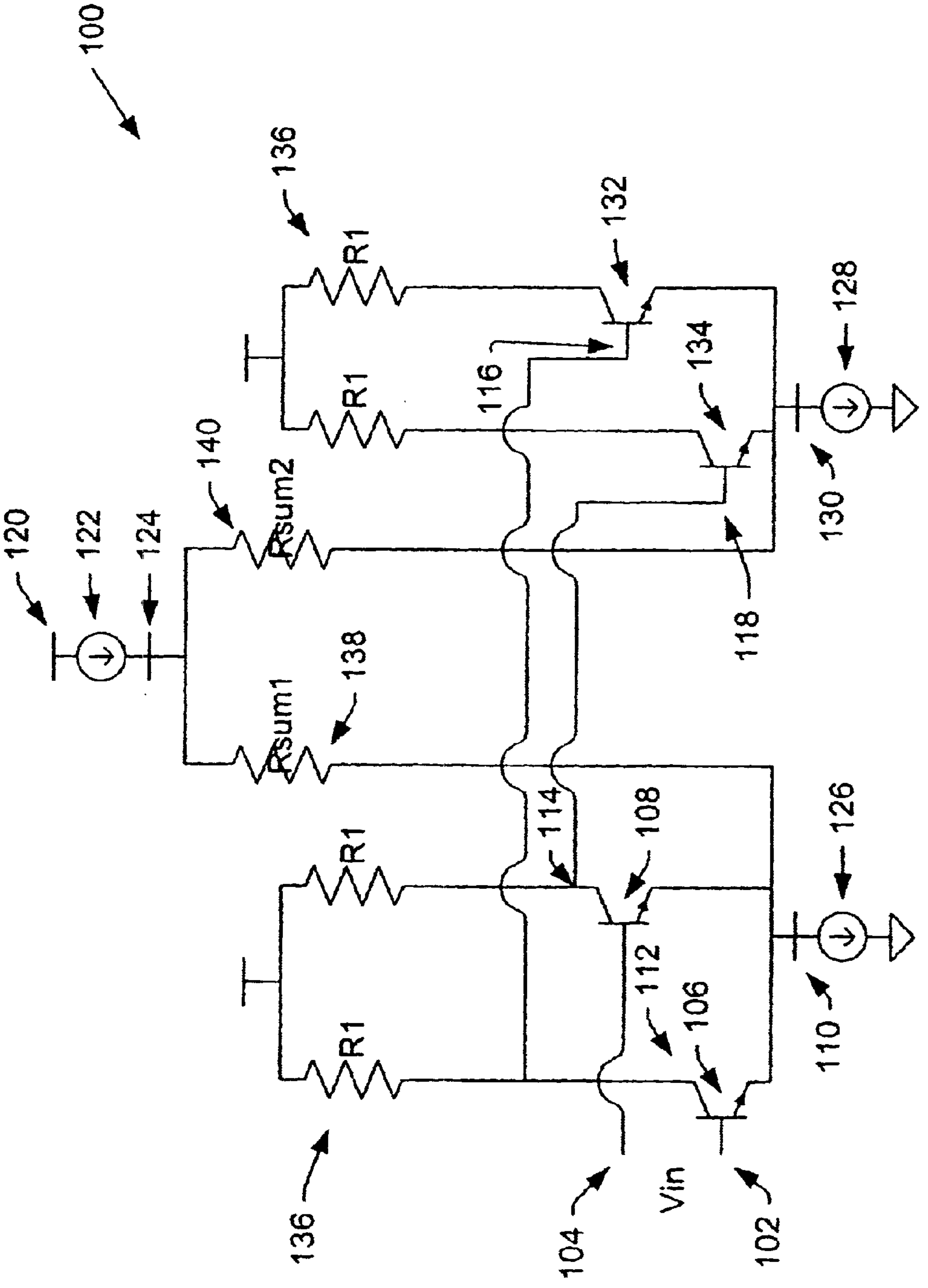
FIG. 3 is a schematic block diagram illustrating the basic architecture for a voltage mode logarithmic amplifier in accordance with the present invention.

FIG. 3 illustrates the basic architecture for a voltage mode logarithmic amplifier at 100 in accordance with one embodiment of the present invention. In an exemplary embodiment, an AC voltage input is applied across first and second base leads 102, 104. The application of an AC voltage across first and second base leads 102, 104 of first and second NPN transistors 106, 108 causes a rectified voltage signal ($V_{rec1}$) at the first common emitter node 110 of the transistors 106, 108. The first and second collector nodes 112 and 114 act as the third and fourth base nodes 116, 118 of third and fourth transistors 132 and 134 respectively.

A current source 120 supplies a current ($I_{rec1}+I_{rec2}$) 122 to the RSSI output node 124. A current ($I_{rec1}+I_{tail}$) 126 is drawn from the first common emitter node 110. A current ($I_{rec2}+I_{tail}$) 128 is drawn from second common emitter node 130. The second common emitter node 130 is the common emitter terminal for third and fourth NPN transistors 132 and 134. As shown in FIG. 3, the logarithmic amplifier is composed of two gain stages, each having an NPN differential pair 106, 108 and 132, 134 with R1 resistive loads 136 and $I_{tail}$ that set the gain based on Eq. 1:

$$A = \frac{R1 \times I_{tail} xq}{kxT} \qquad \text{Eq. 1}$$

The input voltage to the first stage and the successive input voltages in latter stages are being rectified on the common emitter node 110, 130 of every stage. The rectified signals at the first common emitter node 110 and second common emitter node 130 are averaged, instead of summed, onto the RSSI node 124. The averaging is based on voltage division, wherein Rsum1 and Rsum2 are the respective values of first summing resistor 138 and second summing resistor 140. The output impedance of the current source 120 is infinite. Therefore, the resulting RSSI voltage is as shown in Eq. 2.

$$\frac{\delta(Vrec1) + \delta(Vrec2)}{2} = \delta(Vrssi) \qquad \text{Eq. 2}$$

The bandwidth of the cascade of amplifiers limits the RF frequency at which an AC input voltage may be converted to a DC voltage at the RSSI output 124. The bandwidth is determined by the $f_t$ of the NPN transistors and the RC pole due to the load resistor and the total capacitance at the output of every amplifier. The voltage mode logarithmic amplifier of the present invention lacks the active current rectifiers of the prior art current mode logarithmic amplifiers. Therefore, the voltage mode logarithmic amplifier lacks the capacitance, base current, noise and power consumption associated with an active current rectifier resulting in a potentially better scheme when compared to an equivalent current mode logarithmic amplifier.

The drawback of the voltage mode logarithmic amplifier is its sensitivity to temperature variations and DC offsets. An ideal RSSI output remains constant with varying temperature, and varies only with signal strength. Sensitivity to temperature in the voltage mode logarithmic amplifier results in a combination of offset and gain errors at the RSSI output, as shown in FIGS. 4A–4C.

Figure 4A:
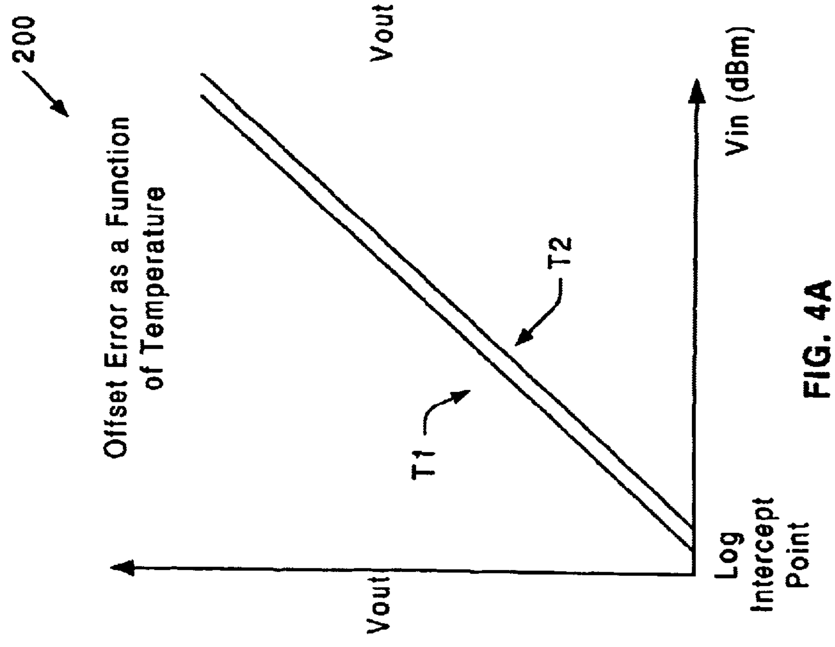
FIG. 4A is a graph illustrating the RSSI output voltage at two different temperatures plotted on a logarithmic scale.

FIG. 4A shows the RSSI output voltage at two temperatures plotted on a logarithmic graph at 200. Offset error for varying temperature is shown as a lateral shift on a log scale. With the input terminal to the voltage mode logarithmic amplifier shorted, the DC voltage at the RSSI node 124 (FIG. 3) is as shown in Eq. 3.

$$V_{RSSI}=V_{supply}-I_{PTAT}\times R_1-V_{BE}+I_{rec1}\times R_{sum1} \qquad \text{Eq. 3}$$

Figure 4B:
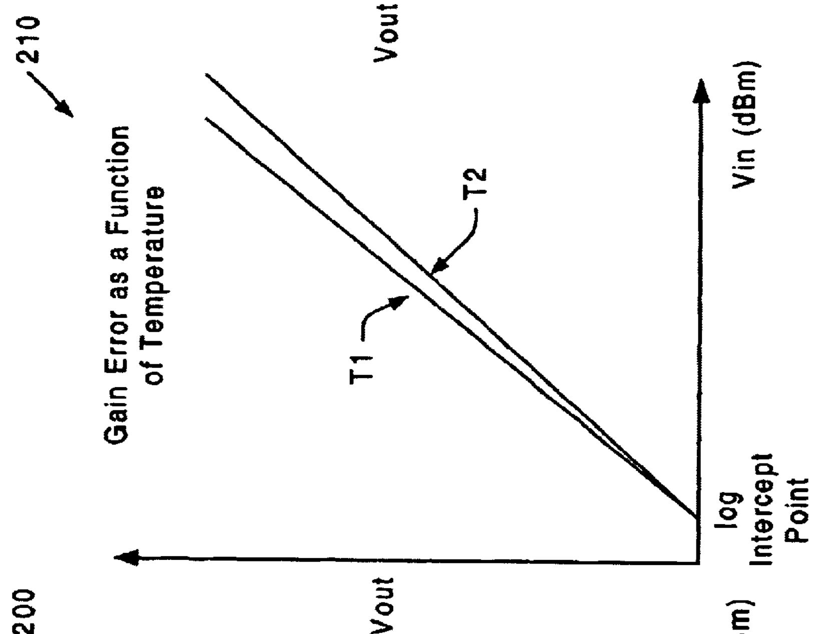
FIG. 4B is a graph illustrating gain error as a function of temperature on a logarithmic scale.
Figure 4C:
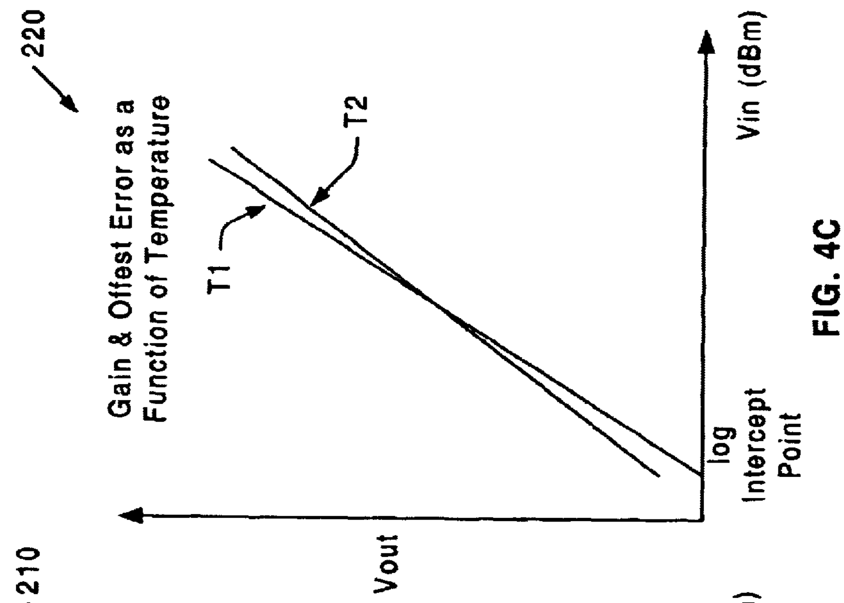
FIG. 4C is a graph illustrating the combination of gain error and offset error at different temperatures on a logarithmic scale

FIG. 4B shows gain error as a function of temperature on a logarithmic graph at 210. FIG. 4C shows the combination of gain error and offset error at different temperatures on a logarithmic scale at 220. As temperature increases the DC voltage at the RSSI node 124 (FIG. 3) will decrease by a constant amount at a given temperature, regardless of the input signal (Vin). The amount of offset is shown in Eq. 4:

$$V_{Offset}=\Delta I_{PTAT}\times R_1+\Delta V_{BE} \qquad \text{(Eq. 4)}$$

In order to compensate for this Voffset, a preferred embodiment of the present invention generates a replica voltage that tracks the temperature dependant voltage Voffset. This replica voltage is subtracted from the output voltage in order to compensate for temperature variations.

Figure 5:
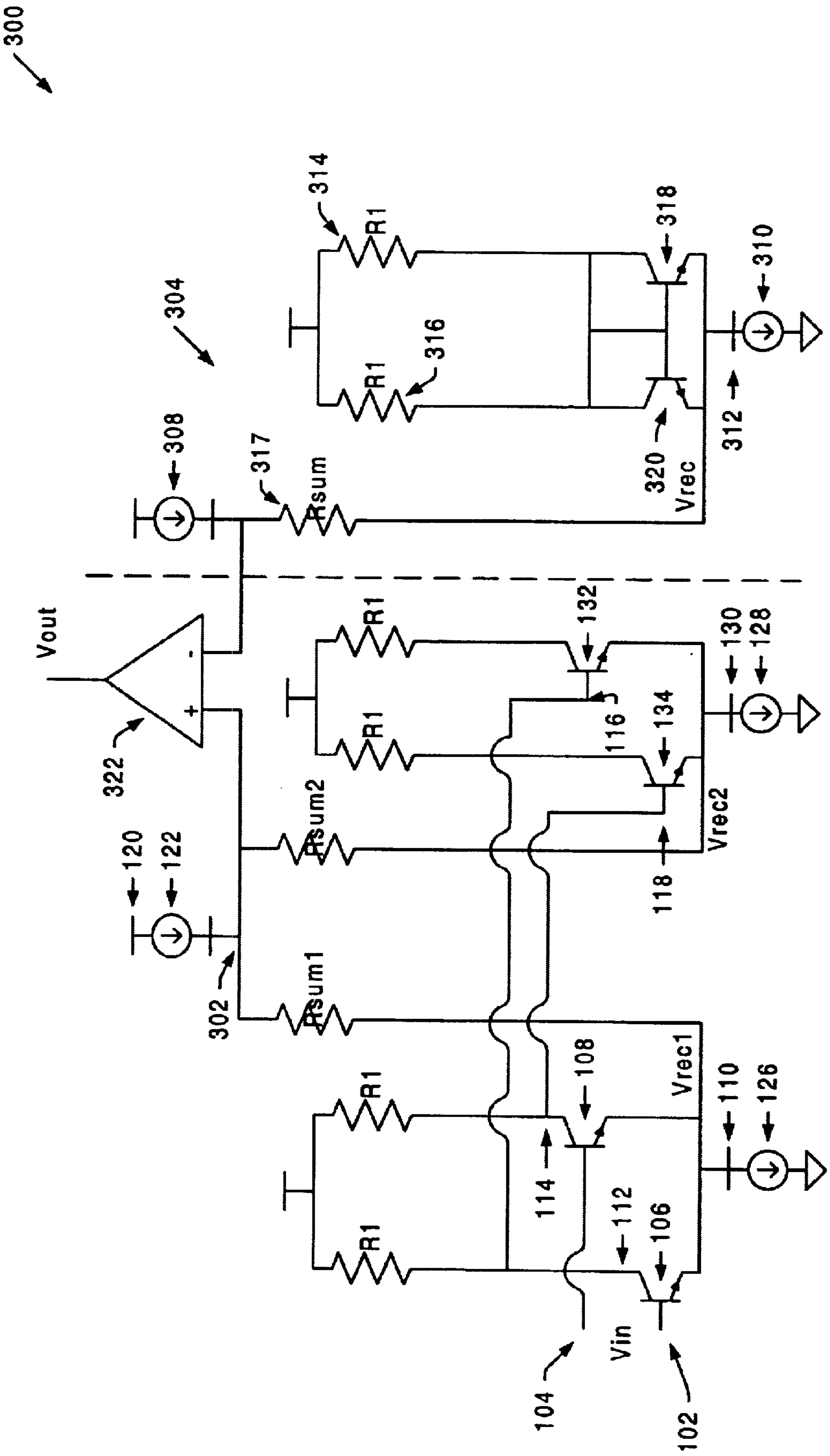
FIG. 5 is a schematic block diagram of a temperature compensated logarithmic amplifier in accordance with one embodiment of the present invention.

FIG. 5 shows a temperature compensated logarithmic amplifier at 300 in accordance with one embodiment of the present invention. An AC voltage signal Vin is applied across first and second base leads 102 and 104. The application of an AC voltage across first and second base leads 102, 104 of first and second NPN transistors 106, 108 causes a rectified voltage signal ($V_{rec1}$) at the first common emitter node 110 of the transistors 106, 108. The first and second collector nodes 112 and 114 act as the third and fourth base nodes 116, 118 of third and fourth transistors 132 and 134 respectively.

A current source 120 supplies a current ($I_{rec1}+I_{rec2}$) 122 to the output node 302. A current ($I_{rec1}+I_{tail}$) 126 is drawn from the first common emitter node 110. A current ($I_{rec2}+I_{tail}$) 128 is drawn from second common emitter node 130. The second common emitter node 130 is the common emitter terminal for third and fourth NPN transistors 132 and 134. As shown in FIG. 5, the temperature compensating logarithmic amplifier 300 is composed of two gain stages, each having an NPN differential pair 106, 108 and 132, 134 with R1, Rsum1 and Rsum2 resistive loads. In addition amplifier 300 includes a self-biased replica stage 304, which operates to compensate for effects on VRSSI caused by variations in temperature.

Self-biased replica stage 304 consists of current source 308, a pair of resistors 314 and 316, summing resistor 317, and a pair of NPN transistors 318 and 320. A current ($I_{rec}+I_{tail}$) 310 is drawn from third common emitter node 312. This current 310 determines $V_{rec}$ at third common emitter node 312. $V_{rec}$ temperature-tracks the voltage on output node 302 and the difference, taken from the output of a differential amplifier 322 represents the offset free RSSI signal. Best temperature tracking is achieved if the potential at the common-emitter nodes 110, 130, 312 are equal, e.g. $V_{rec1}=V_{rec2}=V_{rec}$.

Gain error arises due to the transistor-threshold voltage ($V_{BE}$) of the logarithmic amplifier transistors 106, 108, 132, 134, which is inversely proportionate to temperature. The amplitude of the rectified voltage at the common emitter nodes 110, 130 is dependent on the $V_{BE}$ of these transistors. Per given input amplitude Vin, the RSSI voltage will be larger at high temperatures. This variation in RSSI voltage is signal dependent because small input signals will cause few stages to rectify, whereas large signals will cause many stages to rectify. Logarithmic amplifiers having many stages would be subject to greater gain error due to temperature variations.

In order to overcome this gain error the differential amplifier 322 is designed to have a temperature dependent gain response such that the gain is greater at lower temperatures. This counteracts the effect of the gain error caused by the logarithmic amplifier stages. A differential pair with a resistive load and a constant tail current ($I_{tail}$) would in principle be adequate. However, since the input amplitude to the differential amplifier 322 is greater than Vt, the differential pair is implemented as a triplet. The constant tail current ($I_{tail}$) is derived from an internal bandgap reference.

Figure 6:
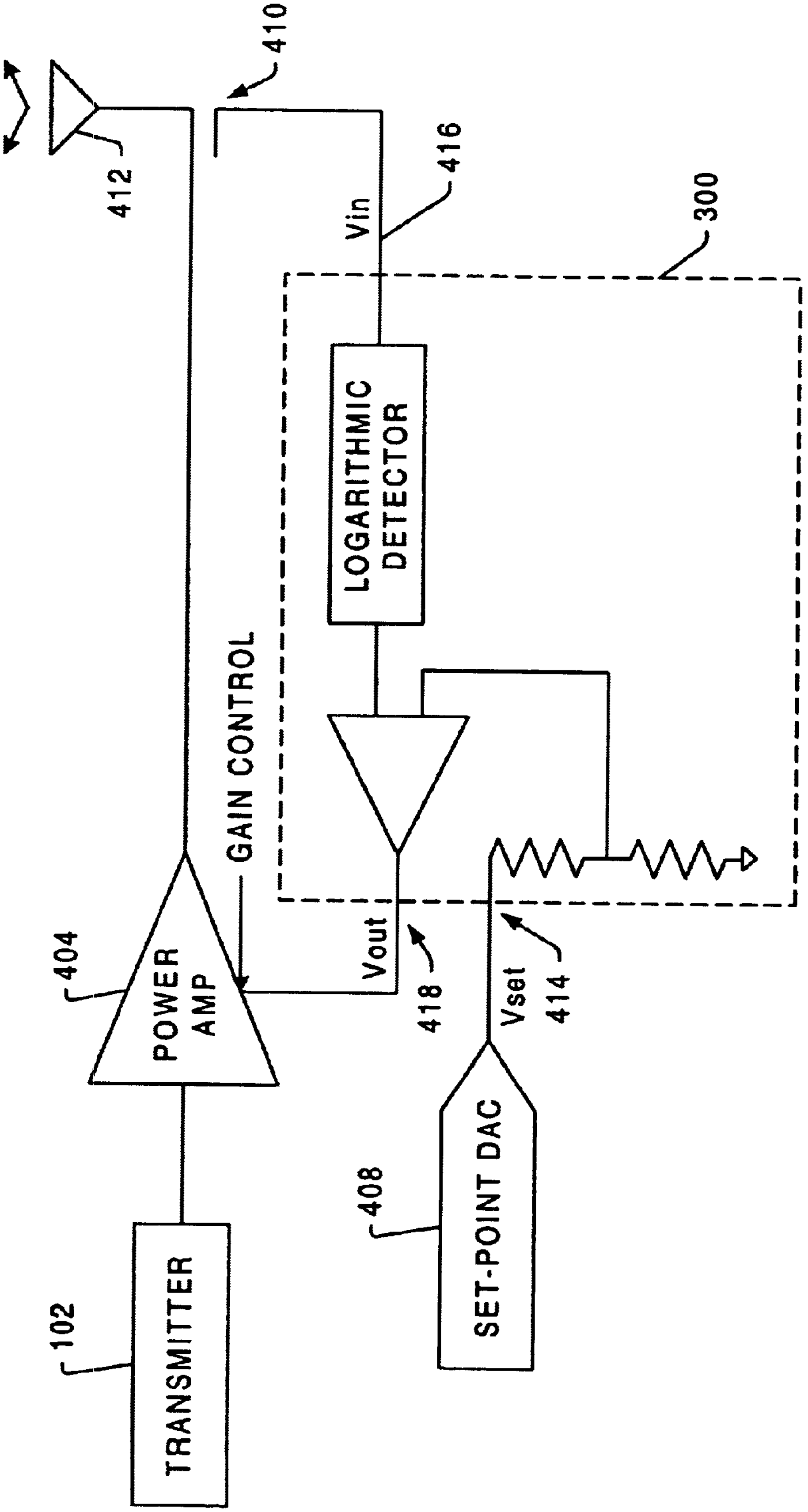
FIG. 6 is schematic block diagram of a temperature compensated logarithmic amplifier being used as a logarithmic controller in accordance with the present invention.

FIG. 6 shows a temperature compensated logarithmic amplifier being used as a logarithmic controller at 400 in accordance with the present invention. The logarithmic controller 400 consists of a logarithmic amplifier circuit 300, a transmitter 402, a power amplifier 404 having a gain control pin 406, a set-point dac 408, a coupler 410, antenna 412, Vset pin 414, Vin pin 416 and Vout pin 418.

A voltage (Vset) corresponding to a desired power level for the power amplifier 404 is set by the set-point dac. The feedback action of the circuit 400 will logarithmically vary the gain of the power amp 404 until 'Vout' is equal to 'Vset'. In accordance with an alternative embodiment the Vout pin 418 is shorted to the Vset pin 414 in order for the control circuit 400 to function as a detector.

Figure 7:
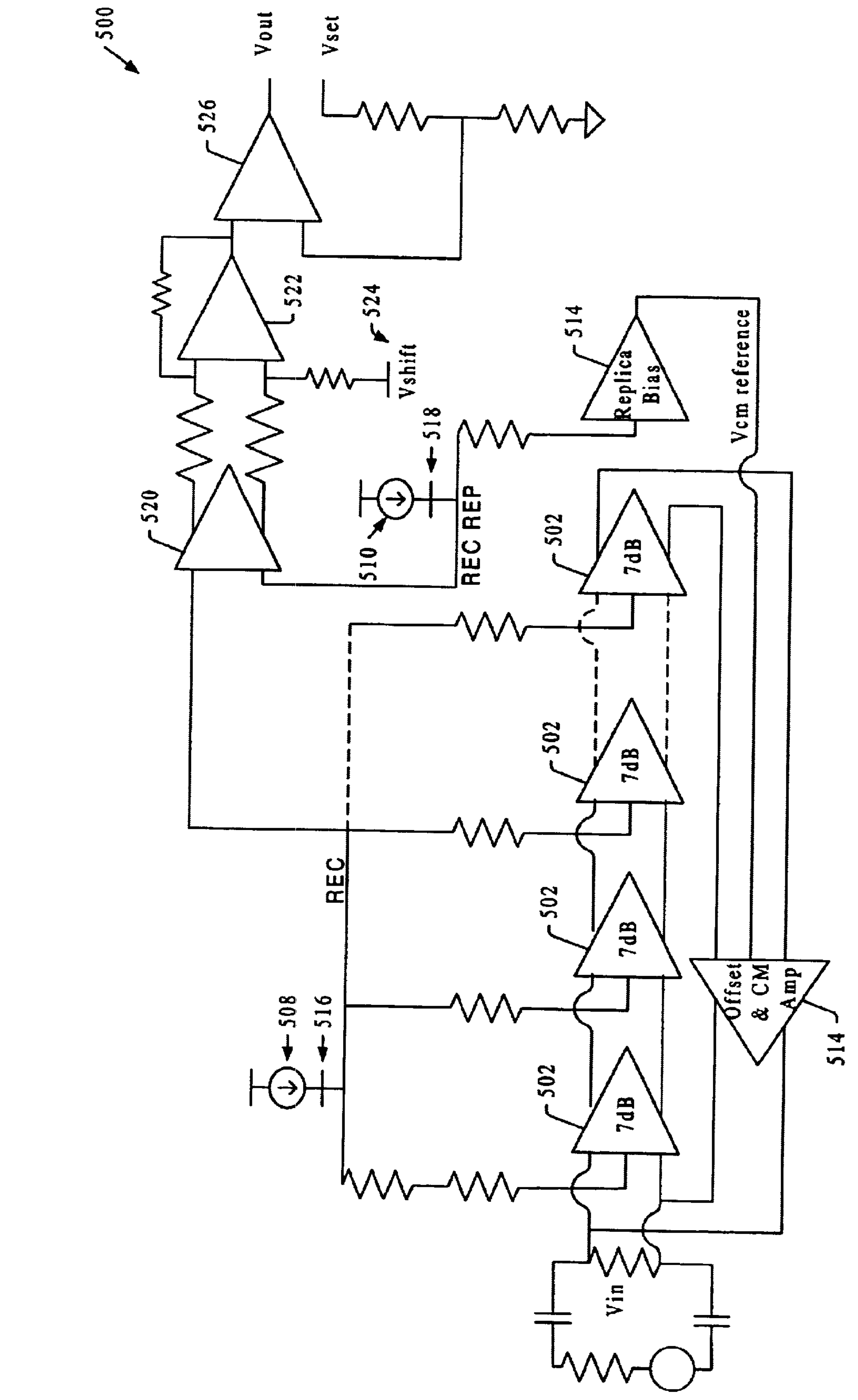
FIG. 7 is a schematic block diagram of an exemplary logarithmic amplifier in accordance with a preferred embodiment of the present invention.

FIG. 7 shows an exemplary logarithmic amplifier at 500 in accordance with a preferred embodiment of the present invention. The logarithmic amplifier 500 is comprised of a cascade of ten gain stages 502, each having a 7 dB gain. The resulting logarithmic amplifier 500 has a mid-band gain of 70 dB. Sensitivity to low input power is degraded as frequency increases due to reduction in gain being dependent on the location of high frequency poles. A low frequency pole, determined by the AC coupling capacitance and input impedance, sets the lowest frequency below which the gain drops.

Apart from the noise of the 50 ohm matching resistor, the input referred noise is primarily a function of shot noise and base resistance in the first stage. Noise from subsequent stages is referred back to the input by the preceding gain. Therefore, the first stage is designed with a 4 mA tail current and 6 ohms of base resistance, which produces the least noise compared to latter stages whose tail current is scaled down by a factor of 2. The last six stages (only one of which is shown) each have a tail current of 250 uA and the load resistance of these stages together with the capacitance at their outputs sets the location of six high frequency poles that limit the bandwidth of the logarithmic amplifier 500.

In a preferred embodiment, all gain stages 502 are fully differential in order to achieve best power supply rejection. The rectifier currents ($I_{rec}$) are set to 50 uA with the exception of the first stage whose $I_{rec}$ is fixed at 25 uA. A larger Rsum and smaller $I_{rec}$ in the first stage reduce the effect of deviation from an ideal log-law behavior caused by large input signals. The current sources are cascaded by an NMOS to reduce coupling from later stages back to the first stage via a Vb1 bias line. A 74 ohm NiCr unit resistance is used for the resistive loads and in all tail and rectifier current sources scaled from a ΔVbe-PTAT-bias-generator. The PTAT bias generator also provides the currents Isum 508 and Isumrep 510.

As discussed with reference to FIG. 5, best temperature tracking is achieved when the DC voltage at each common emitter node is equal. For the second through tenth gain stages, the potential on the common emitter node is set by the preceding stage. This relationship is shown in Eq. 5:

$$V_{rec}=V_{supply}-I_{PTAT}\times R_1-V_{BE} \quad \text{(Eq. 5)}$$

$V_{rec}$ in the first gain stage 502 is a Vbe drop from the common-node voltage in the offset nulling amplifier 512 which in turn is set by a common-node feedback whose reference (Vcm reference) is derived from a replica bias block 514. The value of Vcm is Vsupply−IPTAT×R1 and is identical to the common-node voltage of all other stages when IPTAT and R1 match the currents and resistances of all other gain stages 502.

The difference between nodes 'REC' 516 and 'REC REP' 518 is the un-amplified RSSI voltage before gain correction. This voltage difference is applied to first differential amplifier 520. In an exemplary embodiment first differential amplifier 520 provides 0 dB of gain at 27° C. In order to correct for temperature induced gain error the tail current is biased by a temperature dependent current source derived from a bandgap such that at 85° C. and −20° C. the signal is gained by +1.2 dB and −1.2 dB respectively.

In an exemplary embodiment the differential pair is implemented as a triplet in order to linearly amplify signals as large as 80 mV. In such an implementation the fully differential voltage from first differential amplifier 520 is shifted down and amplified by the closed loop fully-differential-to-single ended amplifier 522. 'Vshift' 524 is derived from a bandgap reference and is nominally 100 mV at 27 deg. C.

In order to provide controller functionality the output interface has to be configured as a non-inverting amplifier and its closed loop gain is set to 2. Therefore, when the input pins are shorted, the output voltage from the logarithmic amplifier 500 will be 200 mV and about 1.6V when the input signal is at the low and high extreme of the dynamic range respectively. The dynamic range being defined as the lowest to the highest RF input power for which the logarithmic amplifier 500 produces an equivalent representation at its output with +/−3 dB error from an ideal decibel scaled DC representation over the temperature range of −40 deg. C. to 85 deg. C.

In the above exemplary embodiment 'Vshift' 524 can be made to vary with temperature such that a temperature induced offset error 200 (FIG. 4A) is eliminated. In the logarithmic amplifier 500 'Vshift' has a nominal slope of PTAT current impressed on a temperature independent resistor. A digital trim option is available to select between different slopes.

The voltage signal produced by closed loop amplifier 522 is applied to a non-inverting amplifier 526, which provides more than 400 uA of sink capability. No trim capability for the non-inverting amplifier is available, but the closed loop gain from the input of this amplifier to the output is only 2. It should be noted that this could cause problems if the offset substantially drifts with temperature.

Figure 8:
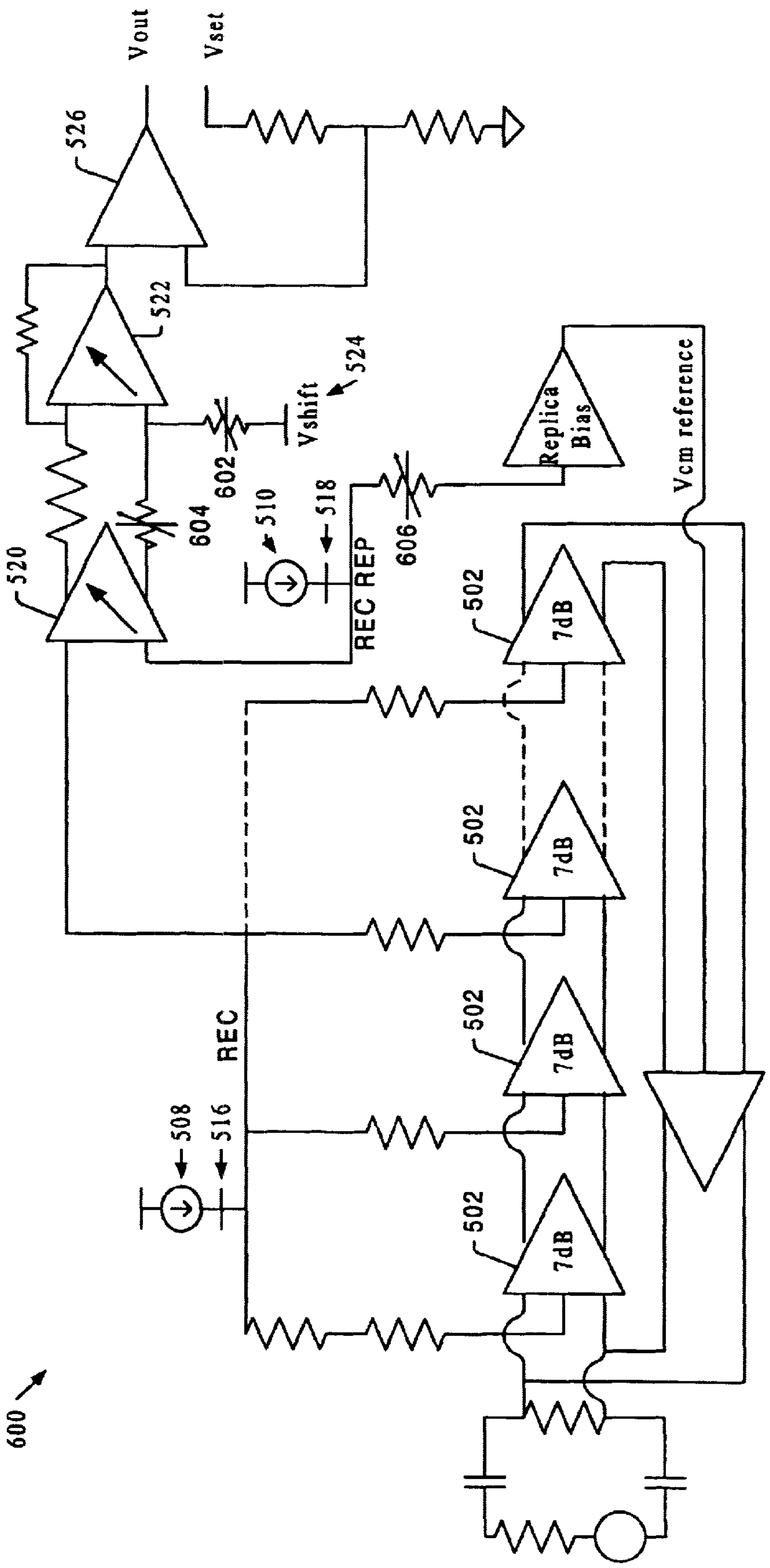
FIG. 8 is a schematic block diagram of a logarithmic amplifier in accordance with an alternative embodiment of the present invention.

FIG. 8 shows a schematic block diagram of an exemplary logarithmic amplifier with digital-trim adjustment at 600. In order to reduce output range degradation caused by a combination of DC offsets between common-emitter nodes and a mismatch with the replica block, a trim feature is added to the logarithmic amplifier 600. In order to overcome this degradation in output range the voltage value of Vshift 524 is trimmed until the voltage on nodes 'REC' 516 and 'RECREP' 518 are equal.

In order to eliminate the offset in the DC RSSI chain, a trim capability is added to the first differential amplifier 520 and closed loop amplifier 522, and second and third SiCr resistors 604, 606 are added having a trim feature. SiCr resistors 602, 604, 606 must be used because currently analog trim is unavailable on NiCr resistors. To successfully eliminate the gain error due to temperature, the bandgap voltage must also be trimmed.

The foregoing examples illustrate certain exemplary embodiments of the invention from which other embodiments, variations, and modifications will be apparent to those skilled in the art. The invention should therefore not be limited to the particular embodiments discussed above, but rather is defined by the following claims.

What is claimed is:

1. A voltage mode logarithmic amplifier for producing a decibel scaled output voltage signal, comprising:

a first gain stage for providing at least one amplified rectified voltage signal responsive to at least one input voltage signal;

a second gain stage for providing at least one further amplified rectified signal responsive to said at least one input voltage signal and said at least one amplified rectified signal; and an output node for producing at least one output voltage signal that is responsive to said at least one amplified rectified voltage signal and said at least one further amplified rectified voltage signal wherein said at least one output voltage signal includes at least one combination of said at least one amplified rectified voltage signal and said at least one further amplified rectified voltage signal, and wherein said at least one combination of said at least one amplified rectified voltage signal and said at least one further amplified rectified voltage signal output voltage signal includes an average of said at least one amplified rectified voltage signal and said at least one further amplified rectified voltage signal, and wherein said average is obtained through a plurality of resistors coupled to the first and second gain stages.

2. An apparatus as recited in claim 1, wherein said at least one combination of said at least one amplified rectified voltage signal and said at least one further amplified rectified voltage signal output voltage signal includes at least a partial sum of said at least one amplified rectified voltage signal and said at least one further amplified rectified voltage signal.

3. An apparatus as recited in claim 1, wherein said first gain stage does not include an active current rectifier.

4. An apparatus as recited in claim 1, wherein said at least one amplified rectified voltage signal and said at least one further amplified rectified voltage signal are of substantially equal amplitude.

5. A voltage mode logarithmic amplifier for producing a decibel scaled output voltage signal, comprising:

a first gain stage for providing at least one amplified rectified voltage signal responsive to at least one input voltage signal;

a second gain stage for providing at least one further amplified rectified signal responsive to said at least one input voltage signal and said at least one amplified rectified signal;

an output node for producing at least one output voltage signal that is responsive to said at least one amplified rectified voltage signal and said at least one further amplified rectified voltage signal;

a self-biased replica stage operative to provide at least one voltage offset signal responsive to temperature; and at least one differential amplifier operative to receive said at least one voltage offset signal and provide a temperature corrected output voltage signal responsive to said at least one input voltage signal, wherein said at least one differential amplifier is communicatively coupled to both said first gain stage and said second gain stage.

6. An apparatus as recited in claim 5, wherein said at least one differential amplifier includes a chain of three differential amplifiers.

7. An apparatus as recited in claim 6, wherein said chain of three differential amplifiers includes at least one operational amplifier and at least one inverting amplifier.

8. An apparatus as recited in claim 5, wherein said at least one differential amplifier includes a differential amplifier having at least one first input for receiving said at least one combination of said at least one amplified rectified voltage signal and said at least one further amplified rectified voltage signal, and at least one second input for receiving said at least one voltage offset signal.

9. A voltage mode logarithmic amplifier comprising:

at least one first transistor device having a first base node, a first collector node and a first emitter node;

at least one second transistor device having a second base node, a second collector node and a second emitter node, wherein said second emitter node is communicatively coupled with said first emitter node, and wherein said first and second transistor devices are configured to receive a voltage input signal such that said voltage input signal is applied across said first and second base nodes;

at least one third transistor device having a third base node, a third collector node and a third emitter node, wherein said third base node is communicatively coupled to said second collector node;

at least one fourth transistor device having a fourth base node; a fourth collector node and a fourth emitter node, wherein said fourth base node is communicatively coupled to said first collector node, and wherein said fourth emitter node is communicatively coupled to said third emitter node; and at least one raw output node configured to provide at least one raw output voltage signal responsive to said input voltage signal, wherein said raw output node is communicatively coupled to said first, second, third and fourth emitter nodes.

10. An apparatus as recited in claim 9, wherein said raw output node is communicatively coupled to said first, second, third and fourth emitter nodes via at least one electrically resistive coupling.

11. An apparatus as recited in claim 9, wherein said raw output voltage is an average of the voltage values at said first, second, third and fourth emitter nodes.

12. An apparatus as recited in claim 9, wherein said raw output voltage is at least a partial sum of the voltage values at said first, second, third and fourth emitter nodes.

13. An apparatus as recited in claim 9, further including a plurality of additional transistor device pairs each having a common emitter node such that said plurality of additional transistor device pairs form a cascade of amplifiers, wherein the voltage at each common emitter node from every transistor device pair in said cascade is averaged to provide said output voltage, wherein a first individual transistor device of said plurality of additional transistor device pairs has a first individual base node, a first individual emitter node and a first individual collector node, and wherein a second individual transistor device of said plurality of additional transistor device pairs has a second individual base node, a second individual emitter node and a second individual collector node, and wherein said first individual emitter node and said second individual emitter node are communicatively coupled, and wherein said first individual base node, said first individual collector node, said second individual base node and said second individual collector node are all communicatively coupled.

14. A voltage mode logarithmic amplifier comprising:

at least one first transistor device having a first base node, a first collector node and a first emitter node;

at least one second transistor device having a second base node, a second collector node and a second emitter node, wherein said second emitter node is communicatively coupled with said first emitter node, and wherein said first and second transistor devices are configured to receive a voltage input signal such that said voltage input signal is applied across said first and second base nodes;

at least one third transistor device having a third base node, a third collector node and a third emitter node, wherein said third base node is communicatively coupled to said second collector node;

at least one fourth transistor device having a fourth base node, a fourth collector node and a fourth emitter node, wherein said fourth base node is communicatively coupled to said first collector node, and wherein said fourth emitter node is communicatively coupled to said third emitter node;

at least one raw output node configured to provide at least one raw output voltage signal responsive to said input voltage signal, wherein said raw output node is communicatively coupled to said first, second, third and fourth emitter nodes;

at least one voltage offset correction circuit operative to provide a voltage offset responsive to temperature; and at least one differential amplifier circuit operative to provide a temperature corrected output voltage in response to said raw output voltage and said voltage offset.

15. A method for logarithmically amplifying a voltage input signal comprising the steps of:

receiving a voltage input signal having an amplitude;

providing a first rectified voltage signal in response to said voltage input signal;

providing a second rectified voltage signal responsive to said first rectified voltage signal;

combining said first and second rectified voltage signals to provide a signal strength indicator voltage having an amplitude such that said input voltage amplitude has a geometric relation to said signal strength indicator voltage amplitude;

providing a voltage offset responsive to temperature; and providing a temperature corrected signal strength indicator voltage in response to said voltage offset and said signal strength indicator voltage.

16. A logarithmic amplifier for providing an equivalent decibel scaled output voltage signal, said logarithmic amplifier comprising:

a plurality of serially coupled voltage gain stages responsive to an input voltage signal, each successive voltage gain stage producing a successive amplified rectified voltage signal at a common emitter node of said gain stage; and wherein said decibel scaled output voltage is generated in response to said successive amplified rectified voltage signals by combining voltage across a plurality of resistors, said resistors each having a first and second terminal, each of said first terminal connected with said common emitter node of each of said successive gain stage, and each said second terminal connected together with a common source node, and wherein said common source node is coupled with a current source, such that a signal is generated at said common source node that is geometrically proportional to the sum of all the amplified rectified signals on each common emitter node.

* * * * *